UNITED STATES PATENT OFFICE.

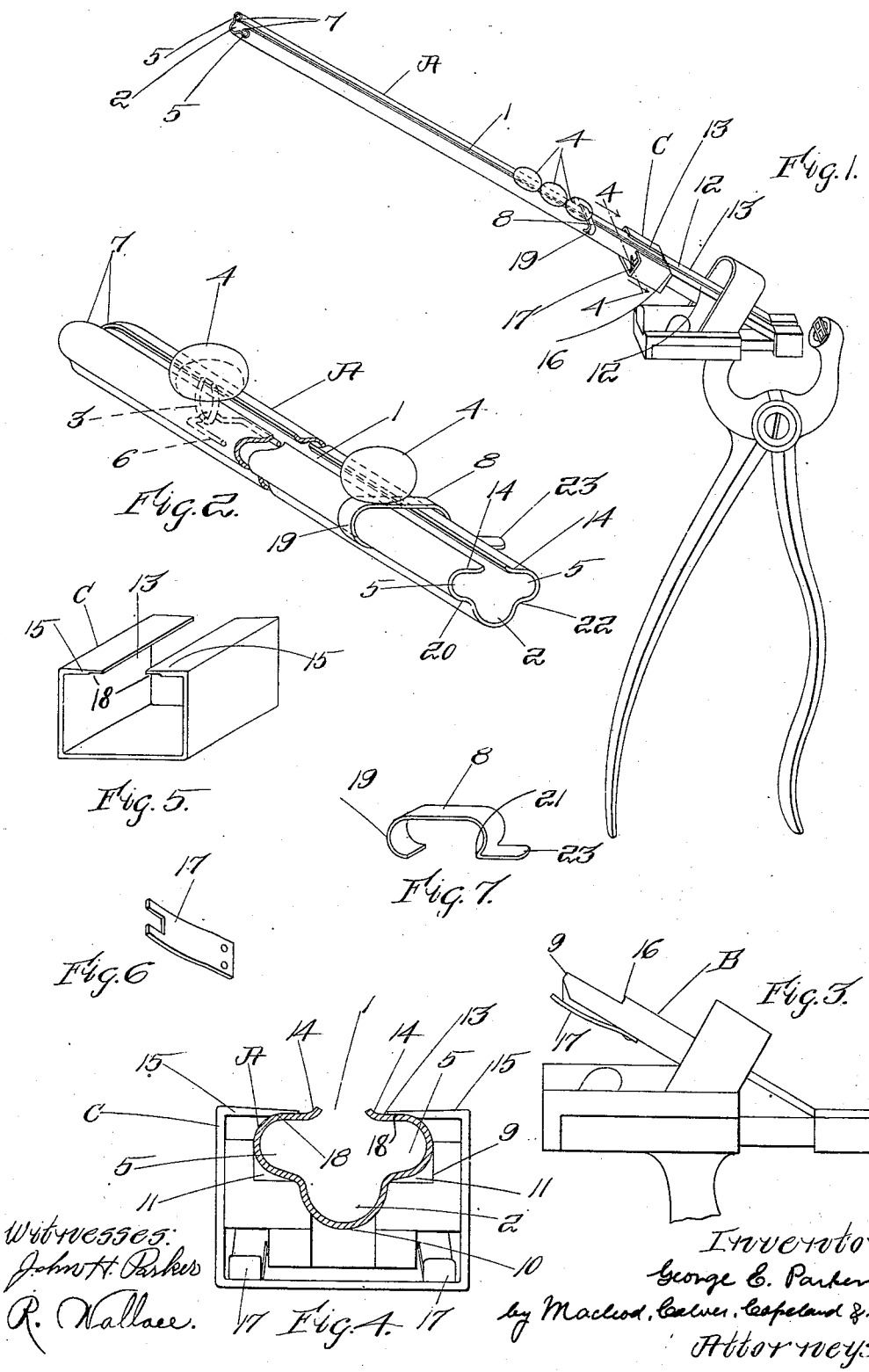

GEORGE E. PARKER, OF BROOKLINE, MASSACHUSETTS, ASSIGNOR TO HEATON-PENINSULAR BUTTON FASTENER COMPANY, OF BOSTON, MASSACHUSETTS, A CORPORATION OF MAINE.

FEED-TUBE FOR BUTTONS AND BUTTON-FASTENERS AND COUPLING MECHANISM.

977,124. Specification of Letters Patent. Patented Nov. 29, 1910.

Application filed December 15, 1909. Serial No. 533,161.

*To all whom it may concern:*

Be it known that I, GEORGE E. PARKER, a citizen of the United States, residing at Brookline, in the county of Norfolk and State of Massachusetts, have invented a certain new and useful Improvement in Feed-Tubes for Buttons and Button-Fasteners and Coupling Mechanism, of which the following is a specification, reference being had therein to the accompanying drawings.

The present invention relates to a feed tube for buttons and button fasteners and attachment for connecting the feed tube with a machine or hand implement for setting the fasteners.

It has been the usual custom heretofore to buy the buttons and fasteners in bulk and to place them in a feed chute which leads to the machine or implement used in setting the fasteners. This necessitates a loss of considerable time on the part of the user of the device in connecting each button with one of the fasteners and then loading up the chute or feed tube preparatory to using the implement and one object of the present invention is to obviate this loss of time by supplying the buttons and fasteners in a feed tube of such a construction that in itself it constitutes a package in which the buttons and fasteners may be shipped and handled until ready for application to the machine or setting implement and which is adapted to be used as the feed tube when applied to the machine.

Another object of the invention is to provide an attachment or coupling device for connecting the feed tube with the setting device and another object of the invention is to so construct the feed tube and coupling that the buttons and connected fasteners will freely slide from the feed tube to the setting tool without obstruction by the coupling.

The invention will be fully understood from the following description taken in connection with the accompanying drawings, and the novel features will be pointed out and clearly defined in the claims at the close of this specification.

In the drawings,—Figure 1 is a perspective view showing a setting tool with a feed tube attached thereto embodying the invention. Fig. 2 is a perspective view of the feed tube and clip on an enlarged scale. Fig. 3 is a side elevation enlarged of a portion of the setting implement for the purpose of showing the sluiceway with which the feed tube is to be connected and the friction spring for binding the coupling to the feed tube and sluiceway. Fig. 4 is an enlarged section on line 4—4 of Fig. 1. Fig. 5 is an enlarged perspective view of the coupling. Fig. 6 is a detail perspective view of the friction spring. Fig. 7 is an enlarged detail view of the clip.

Referring now to the drawings,—A represents the feed tube, B the slotted sluice way of a setting tool which receives the buttons and fasteners from the feed tube and conducts them to the setting jaws of the implement and C represents the coupling for connecting the feed tube with the sluice way.

The feed tube A is provided with a slot 1 extending lengthwise thereof on the upper side through which the shanks of the buttons pass and is provided with a channel or run way 2 in the bottom of the feed tube to afford clearance for the eyes 3 of the buttons 4 and the two opposite lateral guide ways or grooves 5—5 for the guidance and passage of the fasteners 6, the fasteners lying with their legs extending rearward substantially at right angles to the shank of the button in sliding down the feed tube as shown in Fig. 2. In order to retain the buttons and fasteners in the tube after the tube is filled until it is desired to connect it with the setting device, a stop is provided at each end of the tube to prevent the buttons from sliding out endwise. The preferred method of doing this is to bend or crimp in slightly that end of the tube which is the outermost when the tube is attached to the setting implement as indicated at 7. To prevent them from sliding out at the feed end of the tube until ready for use, a spring clip 8 is provided which may be sprung on over the upper side of the feed tube at any point desired, being formed with a curved hook 19 at one end which is adapted to engage with the concave outer face 20 of the feed tube on one side and with a rounded shoulder 21 which is adapted to engage with the concave outer face 22 on the other side of the feed tube and terminating in a finger piece 23 which can be used as a lever in removing the clip. The clip is made of spring metal and should be made to fit so tightly that it will remain in any position to which it may be adjusted on the feed tube; yet its elasticity will allow it to be removed or put on and allow it under pressure to be slid along on the tube. After the feed tube is connected with the setting tool by the coupling, the spring clip may be removed from the lower end so as to allow the buttons to feed and may be reset at any portion of the tube so as to cut off any number of the buttons in the tube from the remaining buttons in the tube. For instance, the operator might desire to leave free in the feed tube a sufficient number of buttons to supply one shoe or a pair of shoes and to cut off the rest so that the feed would be stopped as soon as the required number has been used up.

The sluice way B of the setting implement is formed with a rearwardly extending grooved trough 9 having a bottom groove or channel 10 corresponding with the bottom groove or channel 2 of the feed tube and lateral channels 11 corresponding with the lateral grooves 5 of the feed tube to support the legs of the fastener. The said trough is open at the top. The flange guides 12, 12, of the sluice way B rise above the top of the trough so that the rear ends of the said flange guides will form a shoulder against which the end of the coupling will abut.

The coupling C is tubular with a longitudinal slot 13 throughout its length on the upper side, the interior cross sectional contour of the coupling being such that it will slide or telescope onto the outside of the trough of the sluice way. In the form shown it is substantially rectangular in cross section, except for the slot in the top. The slot 13 through the coupling C is somewhat wider than the slot 1 through the feed tube.

The flanges 14 on each side of the slot 1 in the feed tube are turned upward preferably substantially as high as the top of the flanges 15 of the coupling C, so that the heads of the buttons as they ride down the feed tube will ride on the elevated edges of the flanges 14 and as they pass through the slotted way of the coupling the laterally projecting head of the button projects beyond the inclined flanges of the feed tube. As the button and fastener enter the slotted way of the coupling the head of the button will be raised sufficiently so that it will not strike against the ends of the flanges of the coupling. Preferably the flanges of the feed tube are concaved slightly in cross section as will be seen by reference to Fig. 4 so that the upward incline will be curved instead of straight. Preferably the flanges 15 of the coupling are thinned down toward the inner edges thereby rendering the coupling more easily spread open to permit sliding it into clamping position and preferably also the under side 18 of the thinned edge is curved to fit on the curve of the feed tube so as to avoid a square shoulder. The forward end of the coupling butts up against the shoulder 16 formed by the ends of the flange guides 12 of the sluice way B. The inclined edges of the flanges 14 of the feed tube should be substantially on a level with the flange guides 12 of the sluice way, so that the buttons will slide freely from the feed tube onto the flanges of the sluice way B.

On the under side of the curved trough 9 of the sluice way is a forked spring 17, the forward end of which is secured to the under side of the sluice way, the rear end being free and forked, being normally at a little distance below the sluice way and adapted to be moved up under tension, the forked ends of which will straddle the bottom of the trough 9. When the coupling C is telescoped on to the end of the trough of the sluice way it will engage the spring 17 and press it upwardly toward the trough, the purpose of the spring being to hold the coupling firmly by an elastic pressure in engagement with the trough of the sluice way.

When the supply of buttons and fasteners in the feed tube is exhausted the feed tube may be removed from the setting instrument and another loaded feed tube substituted. The empty feed tube may easily have the crimped end straightened out by running through it a rod of the right form so that the tubes can be reloaded and again have the rear end crimped and the spring clip attached near the other end and the loaded tubes thus prepared can be safely shipped from the place where loaded to the place where they are to be used.

What I claim is:—

1. A feed tube for buttons and attached fasteners having a longitudinal slot throughout its length in the upper side for the passage of the eye of the button, the flanges on each side of the slot being turned upwardly forming a raised seat for the heads of the buttons.

2. A feed tube for buttons and attached fasteners having a longitudinal slot throughout its length in the upper side for the passage of the eyes of the buttons, the flanges on each side of the slot being turned upwardly forming a raised seat for the heads of the buttons, the upturned flanges being slightly concaved in cross-section.

3. A feed tube for buttons and attached fasteners having a longitudinal slot throughout its length in the upper side for the passage of the eyes of the buttons, the flanges on each side of the slot being turned upwardly, in combination with a movable tubular clamp which is adapted to connect said feed tube with a setting implement, said clamp having a longitudinal slot in its upper side in alinement with the longitudinal slot in the feed tube.

4. A feed tube for buttons and attached fasteners having a longitudinal slot throughout its length in the upper side for the passage of the eyes of the buttons, the flanges on each side of the slot being turned upwardly, in combination with a movable tubular clamp which is adapted to connect said feed tube with a setting implement, said clamp having a longitudinal slot in its upper side in alinement with the longitudinal slot in the feed tube, the slot in said coupling being wider than the slot in the feed tube.

5. A feed tube for buttons and attached fasteners having a longitudinal slot throughout its length forming flanges on which the buttons are seated while the shanks of the buttons extend through the slot into the tube, lateral grooves in the sides of the feed tube which form seats and guides for the legs of the fasteners and a central groove in the bottom of the feed tube for the eyes of the buttons, the flanges on each side of the longitudinal slot of the tube being turned upward along the edges of the slot to form raised seats for the buttons as they slide down the feed tube.

6. A feed tube for buttons and attached fasteners having a longitudinal slot throughout its length forming flanges on which the buttons are seated while the shanks of the buttons extend through the slot into the tube, lateral grooves in the sides of the feed tube which form seats and guides for the legs of the fasteners and a central groove in the bottom of the feed tube for the eyes of the buttons, the flanges on each side of the longitudinal slot of the tube being turned upward along the edges of the slot to form raised seats for the buttons as they slide down the feed tube, one end of said feed tube being adapted to be detachably connected with a setting implement and removable means for temporarily barring passage of the buttons and attached fasteners from that end of the tube which is to be connected to the setting implement.

7. A feed tube for buttons and attached fasteners having a longitudinal slot throughout its length forming flanges on which the buttons are seated while the shanks of the buttons extend through the slot into the tube, lateral grooves in the sides of the feed tube which form seats and guides for the legs of the fasteners and a central groove in the bottom of the feed tube for the eyes of the buttons, the flanges on each side of the longitudinal slot of the tube being turned upward along the edges of the slot to form raised seats for the buttons as they slide down the feed tube, one end of said feed tube being adapted to be detachably connected with a setting implement, removable means for temporarily barring the passage of the buttons and attached fasteners from that end of the tube which is to be connected to the setting implement, and a detachable coupling adapted to connect the said feed tube with a setting implement.

8. A feed tube for buttons and attached fasteners having a longitudinal slot throughout its length forming flanges on which the buttons are seated while the shanks of the buttons extend through the slot into the tube, lateral grooves in the sides of the feed tube which form seats and guides for the legs of the fasteners and a central groove in the bottom of the feed tube for the eyes of the buttons, the flanges on each side of the longitudinal slot of the tube being turned upward along the edges of the slot to form raised seats for the buttons as they slide down the feed tube, one end of said feed tube being adapted to be detachably connected with a setting implement, removable means for temporarily barring the passage of the buttons and attached fasteners from that end of the tube which is to be connected to the setting implement, and a detachable coupling adapted to connect the said feed tube with a setting implement, the said removable bar being located at some distance back from the discharge end of the feed tube and free from said coupling.

9. A feed tube for buttons and attached fasteners having a longitudinal slot throughout its length in the upper side, in combination with a slidable tubular clamp which is adapted to connect said feed tube with a setting implement, said tubular clamp having a longitudinal slot in the upper side throughout its length in alinement with the longitudinal slot in the feed tube.

10. A feed tube for buttons and attached fasteners having a longitudinal slot throughout its length in the upper side, in combination with a slidable tubular clamp which is adapted to connect said feed tube with a setting implement, said tubular clamp having a longitudinal slot in the upper side throughout its length in alinement with the longitudinal slot in the feed tube, the flanges of the clamp on each side of the longitudinal slot being thinned on the under side toward their edges where they engage with the feed tube.

11. A feed tube for buttons and attached fasteners having a longitudinal slot throughout its length in the upper side, the flanges in each side of the slot being turned upwardly, the upturned flanges being slightly concaved in cross-section, in combination with a slotted movable coupling which is adapted to clamp the said feed tube to a setting implement, the slot in said coupling being wider than the slot in the feed tube, the flanges of the coupling on each side of the slot being adapted to engage with the concaved portions of the flanges of the feed tube.

In testimony whereof I affix my signature, in presence of two witnesses.

GEORGE E. PARKER.

Witnesses:
　WILLIAM A. COPELAND,
　ALICE H. MORRISON.